UNITED STATES PATENT OFFICE.

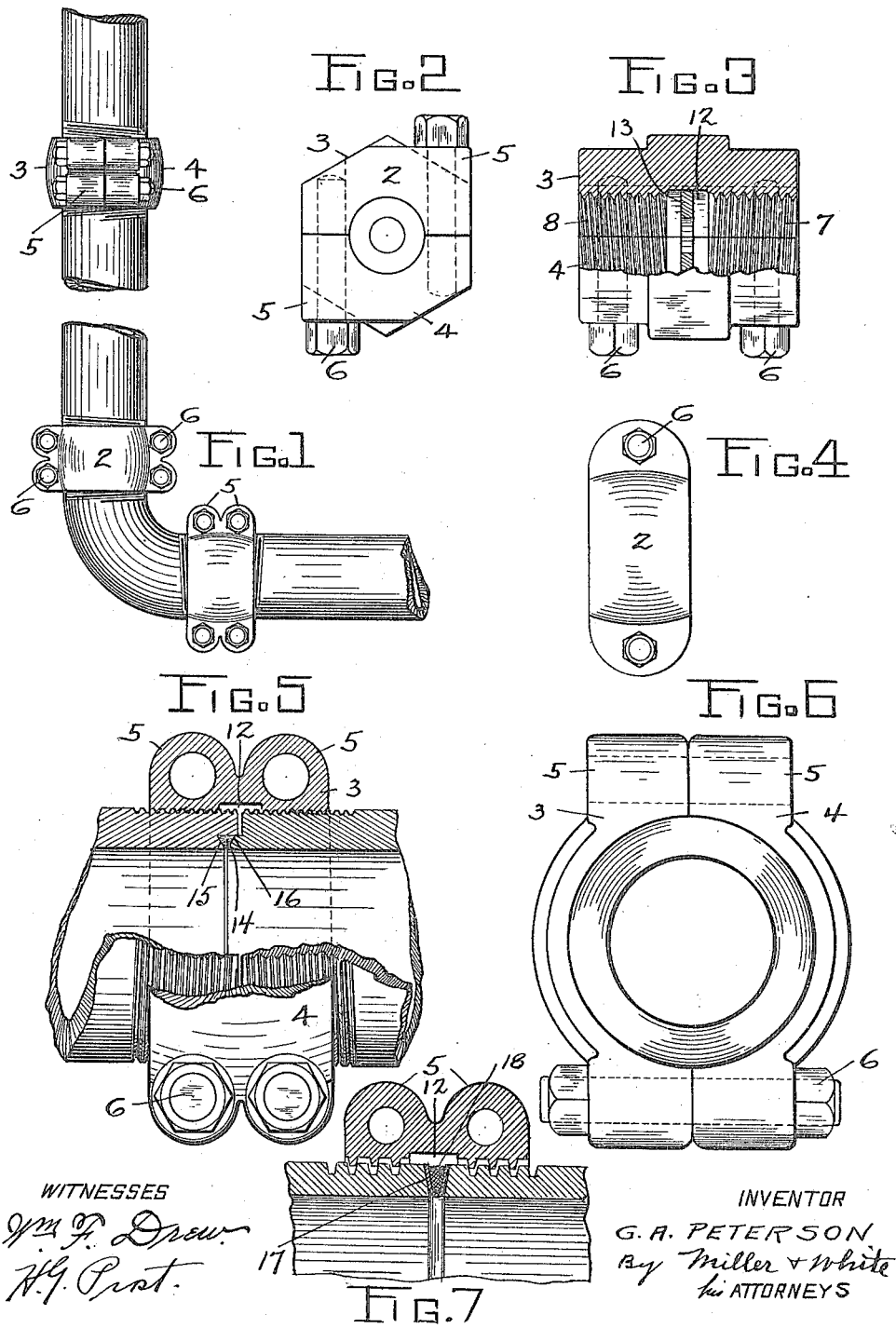

GEORGE A. PETERSON, OF OAKLAND, CALIFORNIA.

PIPE-COUPLING.

1,213,132.                    Specification of Letters Patent.       Patented Jan. 16, 1917.

Application filed March 11, 1912. Serial No. 682,890.

*To all whom it may concern:*

Be it known that I, GEORGE A. PETERSON, a citizen of the United States, and a resident of Oakland, in the county of Alameda and State of California, have invented new and useful Improvements in Pipe-Couplings, of which the following is a specification.

The invention relates to improvements in pipe couplings and similar appliances for joining together the ends of pipes, rods or shafts by engaging projections or threaded portions thereon, adjacent the ends.

The object of the invention is to provide an efficient coupling that may be put on or removed from the pipe without turning the pipe and which will allow any section of the pipe to be uncoupled without taking down any of the other lengths of the pipe, at the same time providing a tight coupling for high pressure work.

In pumping plants, hydraulic or pneumatic machines and other apparatus containing lines or systems of pipes where a section of pipe must be connected at each end to a rigid piece or to a fixed pipe that cannot be turned, and the section or length of pipe itself cannot be turned, it is found impracticable to use screw-coupling of the ordinary kind or description, for the reason that the ends to be joined are frequently at a fixed distance from each other, and neither the pipe nor the piece to which it is to be coupled can be turned to cause the screw threads to act.

The object of the present invention is to provide a screw coupling that can be placed on or removed from the threaded ends of the pipes or pieces to be coupled when either one or both of the parts or pieces can not be turned, and under such conditions the coupling can be placed to secure a tight joint.

While in the drawings and specification I have shown and described the couplings as a pipe coupling it is to be understood that it may be used with equal efficiency in joining rods or shafts.

This device possesses other advantageous features which with the foregoing will be set forth at length in the following description where I shall outline in full that form of embodiment of the invention which I have selected for illustration in the drawings accompanying and forming part of the present specification. It is to be understood that I do not restrict myself by the showing made by such drawings and descriptions as I may adopt many variations within the scope of my invention as expressed in the claims.

Figure 1 represents a portion of a line of pipe having the straight sections joined to an elbow by one form of the couplings of my invention. Fig. 2 is an end view of one of the couplings. Fig. 3 is a side elevation partially in cross section of the coupling. Fig. 4 is a side-view of a coupling having a single set of fastening screws. Fig. 5 is a side-view on an enlarged scale partly in section, of the coupling joining the ends of two sections of pipe showing the triangular packing employed to produce a tight joint between the ends of the pipe. Fig. 6 is an end-view of the coupling shown in Fig. 5 the view being taken from the right side of that coupling. Fig. 7 is a detail of a modification showing the coupling before it is drawn to a seat on the pipes.

This coupling comprises a body 2 having a central screw-threaded bore or opening extending longitudinally through the middle on which line of division the parts are separable so that when separated the two parts 3—4 can be placed upon the abutting or adjoining ends of a pipe which are to be joined by the coupling. While I have herein shown the coupling as composed of two parts, it is evident that it may be composed of three or more parts as desired. Ears or bosses 5 are provided on each half or part with apertures for bolts or screws 6 by means of which the parts are drawn together and secured around the coupled parts; the ears being arranged on opposite sides of the line of separation for that purpose. Usually threaded sockets for the screws are provided in the bosses on one part and the screws being inserted through the ears or lugs on the other part of the coupling act to draw up the two parts tightly around the parts on which the coupling is placed. The number of screws or bolts 6 to insure a tight joint will depend on the length of the coupling; a single set for a short coupling and two on each side for a long one being usually found sufficient for the purpose. As this coupling 2 is designated chiefly to unite two pipes or pieces that cannot well be turned or rotated to screw their ends into the coupling without disconnecting them from other parts or detaching those parts, the coupling is adapted to be turned while the pieces on which it is placed remain stationary. It is therefore properly shaped or provided with angular polygonal faces or sides to take a wrench, and the sockets 7—8 in the ends are reversely threaded, one having a right hand thread and the opposite one a left hand thread. Thus formed, it will be seen, that when the two parts previously separated are placed around the abutting ends of two pipes or pieces as seen in Fig. 5 and then drawn together by means of the screws 6 the internally threaded sockets will engage the threaded ends of the inclosed pipes, and they will be drawn into the coupling from the opposite ends as the latter is turned on the pieces. It is understood, of course, that the adjoining ends of the pipes are provided with right and left hand threads to correspond to the threads in the sockets 7—8. Instead of right and left threads, two threads of different pitch may be used; or the end of one pipe may be grooved or provided with a shoulder and the other end may be threaded. It is evident that there are various ways in which the pipes may be drawn together by rotating the coupling and I do not desire to limit myself to the right and left hand threads although such construction may be preferable.

Where the coupled pipes carry fluids or liquids under pressure and gas tight or liquid tight joints are required a recess or groove 12 is provided in the internal face of the coupling between the threaded sockets to hold a ring 13 the bore or aperture of which is somewhat less than that of the inserted pipes serving to determine the position of the pipes as the two parts of the coupling are placed around their ends, and also forming a packing between the ends of the two pipes or pieces being coupled. Instead of being fixed in the coupling itself, the packing is also placed and confined only between the ends of the pipes; and in that modification or arrangement, a seat for the packing is formed in the end of one pipe, and the end of the abutting pipe is properly formed to fit or work in the recess and to bear against the packing and compress the same as the pipes are drawn together by the coupling.

In such modification as I have illustrated in Fig. 5 a packing 14 of triangular form in cross section is employed, and the seat 15 in the end of one pipe is a corresponding shape, with a straight wall parallel with the inner face of the pipe, and an inclined face standing at an angle thereto and extending circumferentially around the inner edge. The end of the opposing pipe is provided with an inclined face on the inner edge, and is cut away to admit the end of the opposite pipe, as seen at 16 in Fig. 5.

The object of the groove 12, other than being used as a seat for the ring 13, is to space apart the sockets 7—8, so that there will be no liability of the right hand thread on the pipe contacting with the left hand thread in the socket and injuring the coupling. Should the threads in the sockets contact at the center it would be difficult to set the coupling on the pipes, so that the center of the coupling would occur exactly at the joint in the pipe.

In Fig. 7 I have shown a modification in which the ends of the pipes are slightly inclined and a ring packing, consisting of a ring 17 of a soft metal, such as copper, having a substantially U-shaped cross section, is arranged between the abutting ends of the pipes. A ring of resilient material 18 is placed within the metal ring to cause it to press against the ends of the pipes and prevent the metal ring from collapsing. This figure also illustrates the method of attaching the coupling to the pipe. I have shown the coupling and pipe ends provided with the standard 29° thread which I have found preferable. I have also found it preferable not to extend the threads to the ends of the pipes, but to halt them a short distance from the ends so that the ends of the pipes retain their full strength and area. This arrangement is advantageous in securing a more perfect joint and prevents liability of injury to the threads, which are easily bruised when the thread extends to the end. It also provides a smooth unbroken surface on the end of the pipe and thereby forms a suitable seat for packing. This feature is not limited to the form of coupling shown in Fig. 7, but may be used in connection with any of the forms shown and described. The coupling is placed on the pipe and the bolts 6 operated to draw the parts together so that the screw threads engage, but do not seat. The coupling is then turned to exert a pull on the pipes and jam the threads together. The bolts are then screwed down tightly, forcing the threads to a seat. On account of the sharp angle of the threads, a large pull is exerted on the pipe as the threads seat and an absolutely tight joint is obtained.

I claim:—

1. In combination with pipes having abutting ends, a pipe coupling divided into two parts longitudinally with oppositely threaded sockets in its opposite ends and having an annular groove between said sockets, alined ears on each of said parts and screw-threaded means engaging said ears adapted to draw the parts together, said parts being rotatable to draw said pipe ends together.

2. A clamp coupling adapted to join and seal two abutting non-rotatable pipes having oppositely threaded ends, comprising a coupling divided into two parts longitudinally and having an annular recess between the ends, said parts having oppositely threaded sockets in the ends thereof adapted to turn upon said abutting pipe ends and draw them together when said coupling is in place, lugs on said parts and bolts extending through said lugs adapted to draw the parts together.

In testimony whereof, I have hereunto set my hand at San Francisco, Cal., this 6th day of March 1912.

GEORGE A. PETERSON.

In presence of—
H. G. Prost,
P. S. Pidwell.